United States Patent [19]

Porter et al.

[11] Patent Number: 5,154,226
[45] Date of Patent: Oct. 13, 1992

[54] AUTOMATIC CHANGEOVER THERMOSTAT WITH SINGLE BI-METAL AND COMMON SET LEVER HAVING INDIVIDUAL HEAT AND COOL SETPOINT INDICATORS

[75] Inventors: Richard B. Porter; Donald P. Kolbow, both of Bloomington, Minn.

[73] Assignee: Honeywell, Inc., Minneapolis, Minn.

[21] Appl. No.: 454,232

[22] Filed: Dec. 21, 1989

[51] Int. Cl.⁵ ................... F25B 29/00; G05D 23/00
[52] U.S. Cl. ........................ 165/11.1; 165/26; 165/27; 165/29; 337/374; 337/376; 337/363; 236/1 C
[58] Field of Search ............ 165/11.1, 12, 26, 27, 165/29; 337/376, 373, 374, 338, 363; 236/1 C

[56] References Cited

U.S. PATENT DOCUMENTS

| | | |
|---|---|---|
| 1.558,277 | 10/1925 | Phelan et al. |
| 1,940,718 | 12/1933 | Koch |
| 2,051,853 | 8/1936 | Hodgman, Jr. |
| 2,120,488 | 6/1938 | Crago ............................ 337/363 |
| 2,403,798 | 7/1946 | Holmes ............................ 165/12 |
| 2,558,610 | 6/1951 | Diekhoff ............................ 165/12 |
| 2,561,067 | 7/1951 | Newton ............................ 165/12 |
| 3,014,704 | 12/1961 | Bierwirth et al. ............. 165/26 |
| 3,046,375 | 7/1962 | Houser ............................ 337/376 |
| 3,047,273 | 7/1962 | Scarr, Jr. ....................... 165/26 |
| 3,130,285 | 4/1964 | Larsen |
| 3,411,711 | 11/1968 | O'Hara et al. |
| 3,758,030 | 9/1973 | Osheroff |
| 3,975,703 | 8/1976 | Andresen, Jr. ................ 337/374 |
| 3,993,120 | 11/1976 | Iberg et al. ..................... 165/26 |
| 4,022,271 | 5/1977 | Monahan ....................... 165/12 |
| 4,306,354 | 12/1981 | Denny ............................ 337/374 |
| 4,775,099 | 10/1988 | Podlipnik ....................... 165/26 |

OTHER PUBLICATIONS

Honeywell Form Number 60-2485-3, dated 1988.

*Primary Examiner*—John Ford
*Attorney, Agent, or Firm*—Gregory A. Bruns

[57] ABSTRACT

A single bimetal automatic changeover thermostat has heating, cooling and changeover switches mounted to the bimetal. A single control point adjustment lever for rotating the bimetal has separate shaped heat and cool set point indicators which are movable along a temperature scale.

4 Claims, 4 Drawing Sheets

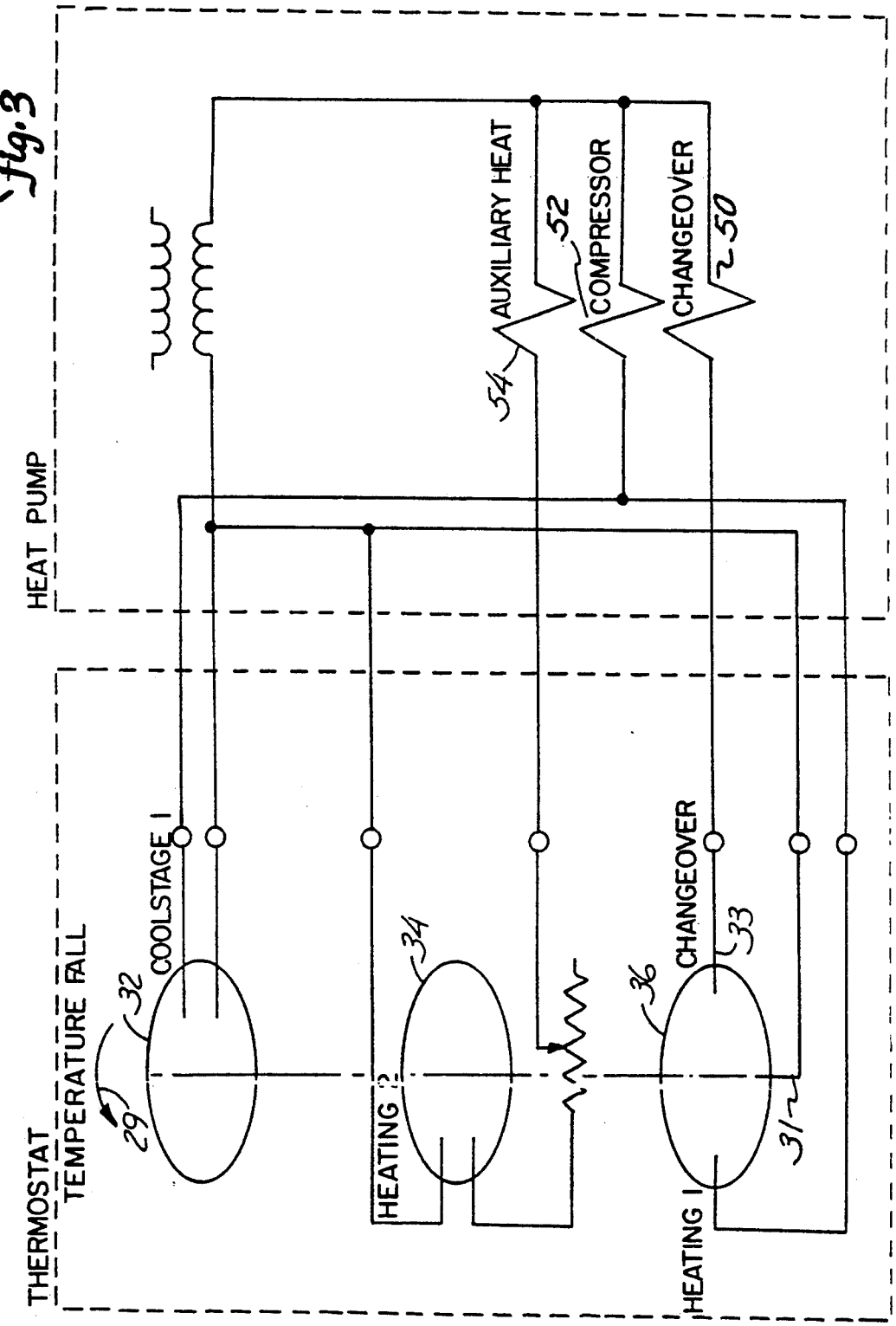

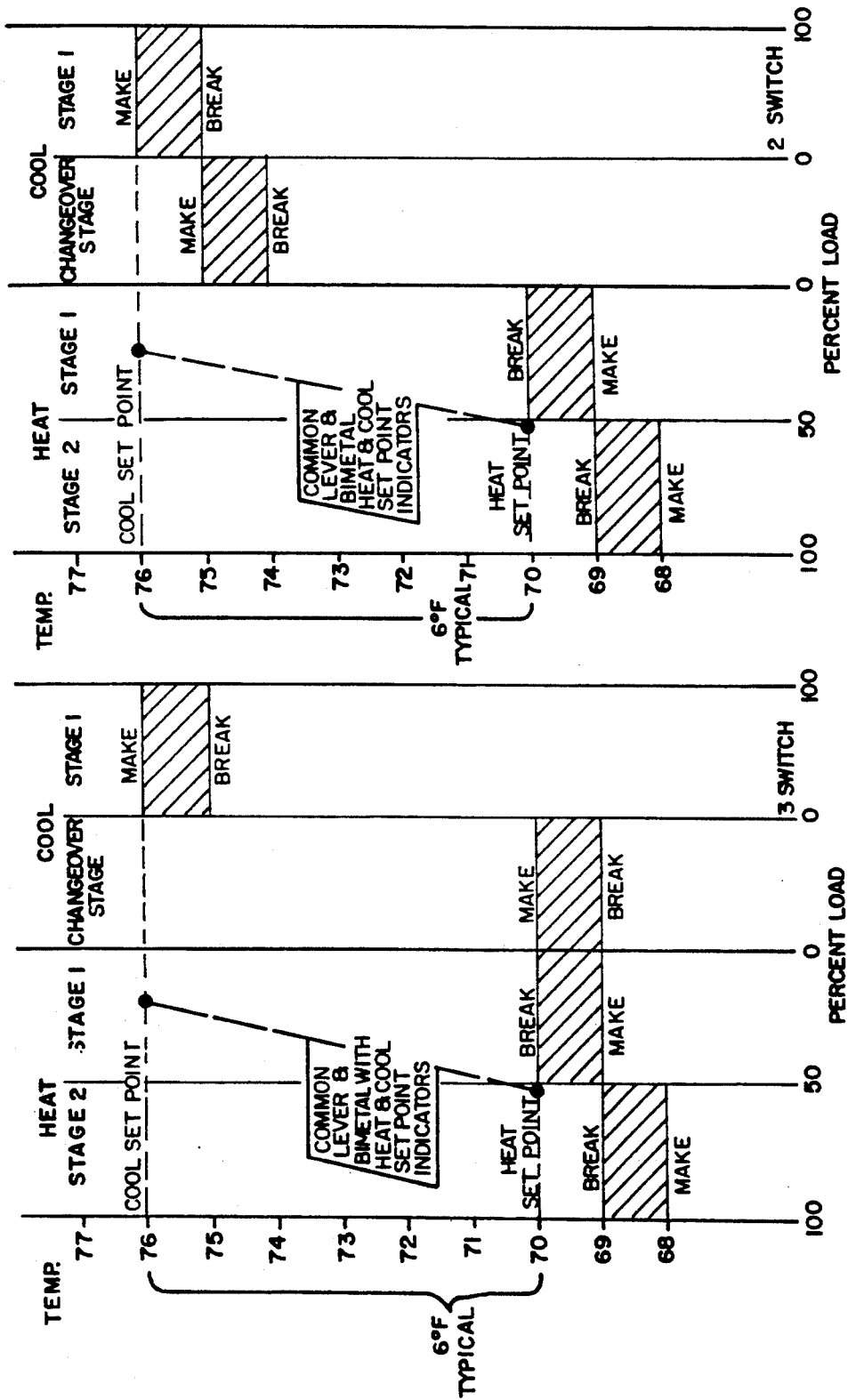

AUTOMATIC CHANGEOVER THERMOSTAT WITH SINGLE BI-METAL AND COMMON SET LEVER HAVING INDIVIDUAL HEAT AND COOL SETPOINT INDICATORS

BACKGROUND OF THE INVENTION

The invention disclosed herein relates generally to wall mounted thermostats of the type for controlling both heating and cooling apparatus and, more particularly to automatic changeover type thermostats.

In the past, automatic changeover thermostats typically have had two separate temperature responsive elements or bimetals, two separate control point adjustment levers and two separate temperature scales. The heating bimetal and an associated heating switch controlled the heating apparatus and a cooling bimetal and an associated cooling switch controlled the cooling apparatus. In addition one of the bimetals activated a changeover switch which enabled either the heating switch or the cooling switch depending on the temperature in the space.

The heating and cooling control point adjustment levers on these thermostats are typically mechanically linked to allow their adjustment to within 2° F. to 6° F. of one another. The 2° F. to 6° F. separation represents a safety margin to reduce the risk of the thermostat causing both heating and cooling apparatus to operate simultaneously or in response to each other. This margin allows for some error in the calibration of the separate bimetals and for the variable heating anticipation current which results in some $I^2R$ heating within the thermostat.

Further, the separate bimetal elements, separate set point levers, and separate temperature scales associated with automatic changeover thermostats results in a high cost to the consumer.

Thus a need exists for a simpler and lower cost automatic changeover thermostat.

SUMMARY OF THE INVENTION

The present invention solves these and other needs by providing a single bimetal automatic changeover thermostat. The necessary heating, cooling, and changeover switches are secured to the single bimetal. A single control point adjustment lever allows limited rotation of the bimetal. The adjustment lever has a color coded heat set point indicator and a separate color coded cool set point indicator spaced from the heat set point indicator. The set point indicators are movable along a temperature scale. In one embodiment the thermostat includes two heating stages, a changeover stage and a single cooling stage.

BRIEF DESCRIPTION OF THE DRAWINGS

FIG. 3 is a simplified schematic representation of one embodiment of applicants invention applied to the control of a heat pump.

FIG. 4 is a diagrammatic representation of the operation of the thermostat application of FIG. 3.

FIG. 5 is a diagrammatic representation of the operation of an alternate embodiment of the present invention.

DESCRIPTION OF THE PREFERRED EMBODIMENT

Figure 1:
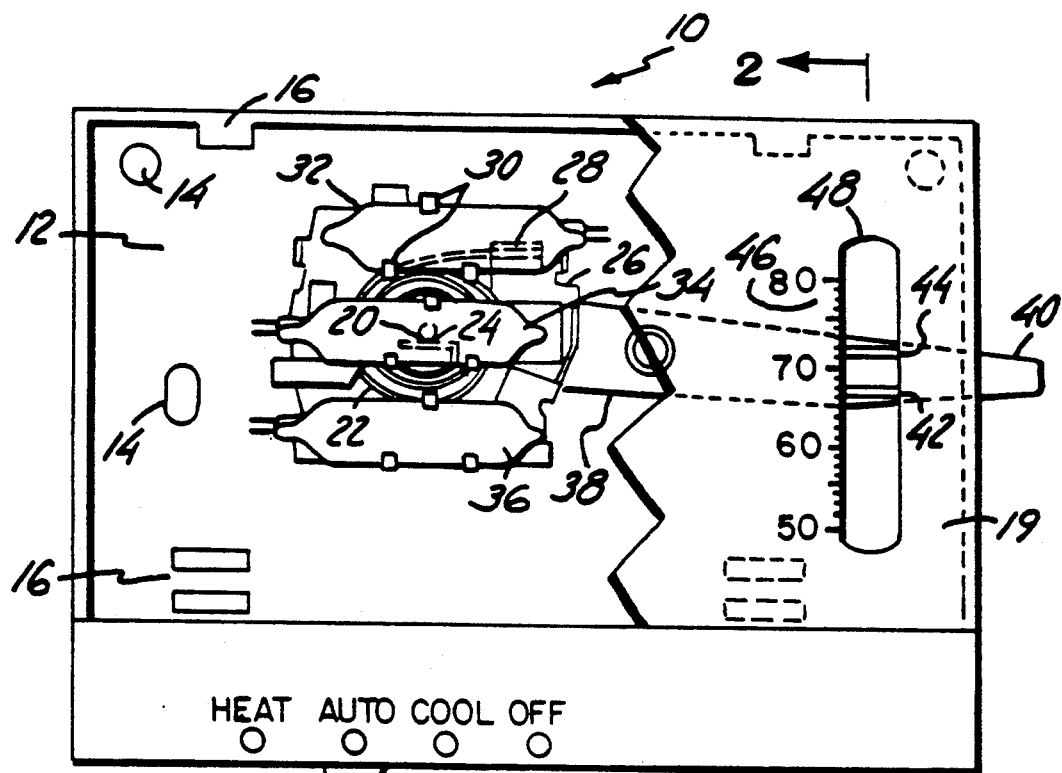
FIG. 1 is a front elevation of a thermostat in accordance with the present invention with a portion of the thermostat cover broken away to better reveal the thermostat construction.

An automatic changeover thermostat according to the teachings of the present invention is shown in the drawings and generally designated 10.

As best shown in FIG. 1, thermostat 10 includes base 12. Base 12 includes mounting holes 14 for securing the base to a wall and molded thermostat cover mounts 16. System switch 18 may be mounted to base 12. System switch 18 provides selection of the mode of heating and or cooling control of the heating and cooling apparatus. The present invention is only concerned with the automatic mode of operation and therefore the system switch will not be further discussed. The fan switch, heating anticipation adjustment, indicating LED's and other features which may be included with base 12 are not shown.

A support post 20 is mounted to base 12 and extends outwardly. Support post 20 is mounted for rotation within base 12.

Cover 19 is shown partially broken away in FIG. 1 to illustrate certain features of thermostat 10.

A temperature responsive element or bimetal 22 is secured for example by welding at end 24 to support member 20. Bimetal 22 is in the form of a coil lying in a plane parallel to and spaced from base 12.

Switch mounting bracket 26 is secured for example by welding to the opposite end 28 of bimetal 22. Switch mounting bracket 26 includes clips 30 for holding switches 32, 34 and 36 that will perform the heating, cooling and changeover switching functions.

Set point adjustment lever 38 is secured to support member or post 20 at a location between base 12 and bimetal 22.

Set point adjustment lever 38 extends outwardly beyond base 12 to be accessible for adjustment at end 40.

Figure 2:
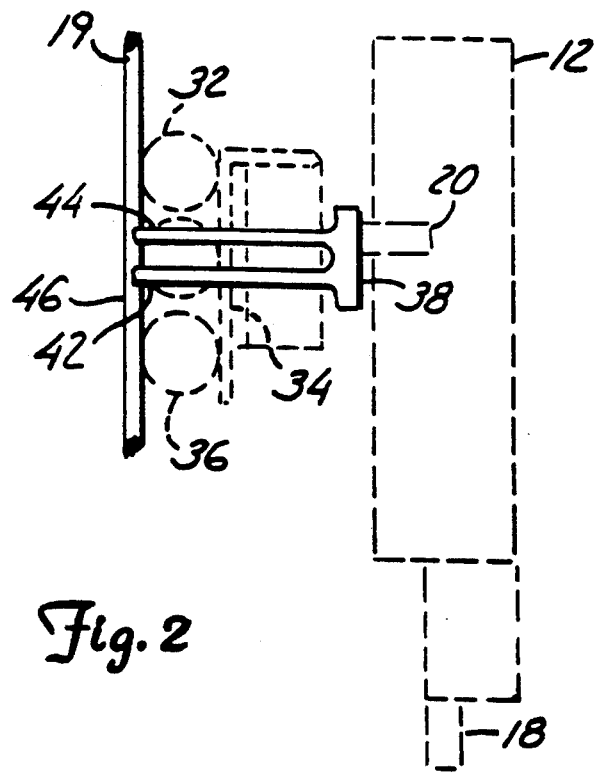
FIG. 2 shows a cross-sectional view of the thermostat of FIG. 1 according to section line 2—2 of FIG. 1.

As shown in FIGS. 1 and 2, lever 38 includes a heat set point indicator 42 and a cool set point indicator 44. The indicators extend outwardly from lever 38 in a direction toward thermostat cover 19. Cool set point indicator 44 is spaced from the heat set point indicator 42 and both indicators may be color coded for user recognition as heat or cool. For example red may be used for heat and blue used for cool.

In the embodiment shown in FIGS. 1 and 2 thermostat cover 19 has a temperature scale 46. Vertical opening 48 located adjacent temperature scale 46 allows a user to view both heat set point indicator 42 and cool set point indicator 44.

Now that the basic construction of thermostat 10 has been disclosed, the operation of thermostat 10 can be set forth and appreciated.

The operation of thermostat 10 will be described in an application of controlling a heat pump; however it will be understood that the heat pump application is only illustrative and that thermostat 10 may be used in a variety of other control applications.

Referring now to FIG. 3, for purposes of describing the operation, it will be assumed that the heat pump includes a cooling changeover relay 50 for operating a reversing valve (not shown) to place the heat pump in a cooling mode. When changeover relay 50 is not energized the heat pump is in the heating mode. changeover relay 50 is energized when the changeover stage is made. With changeover relay 50 in the cooling mode, compressor relay 52 will be energized on a call for cooling by switch coo stage 1.

The heat pump will be further assumed to provide a first stage of heating when the changeover relay is in the heating mode and the compressor relay is energized by heat stage 1. A second stage of heating will be provided when auxiliary heat relay 54 is energized by heat stage 2.

The operation of the system of FIG. 3 may best be explained by reference to FIG. 4 and the following explanation. At temperatures above 77° F. switch 32 is "closed", switch 34 is "open" and switch 36 is closed from common terminal 31 to changeover terminal 33. Therefore the changeover valve 50 is in the cooling position, compressor relay 52 is energized and heat stage 1 and heat stage 2 are "off".

As the temperature falls below 75°, switch 32 will "open" and no heating or cooling will be provided until the temperature falls below 69°. At 69° when the temperature is falling switch 36 will "open" from changeover terminal 33 to common terminal 31 and close from common terminal 31 to heating terminal 35. Changeover relay 50 will then be deenergized on in the heating position and compressor relay 52 will be energized to provide a first heating stage.

If temperature continues to fall to 68° switch 34 will close and energize a second heating stage.

FIG. 4 illustrates the operation of a three switch embodiment of the invention with a heat set point of 70° F. and a cool set point of 76° F. As shown in FIG. 4, when the conditioned space requires cooling, cooling stage 1 will operate to maintain the temperature of the conditioned space between 75° F. and 76° F.

As the load of the conditioned space changes from a cooling load to a no load condition neither heating or cooling will be provided by the heat pump. This no load condition will exist as long as the temperature of the conditioned space is between 70° F. and 76° F.

If the load of the conditioned space becomes a heating load the changeover stage will deenergize changeover relay 50 and heat stage 2 will energize the compressor when the temperature of the conditioned space falls to 69° F.

If the load of the conditioned space is such that the temperature continues to fall, then heat stage 2 will energize auxiliary heat relay 54 at 68° F.

FIG. 4 illustrated the operation of a 3 switch embodiment of applicant's invention. FIG. 5 illustrates an alternate embodiment which uses 2 switches.

Figure 6:
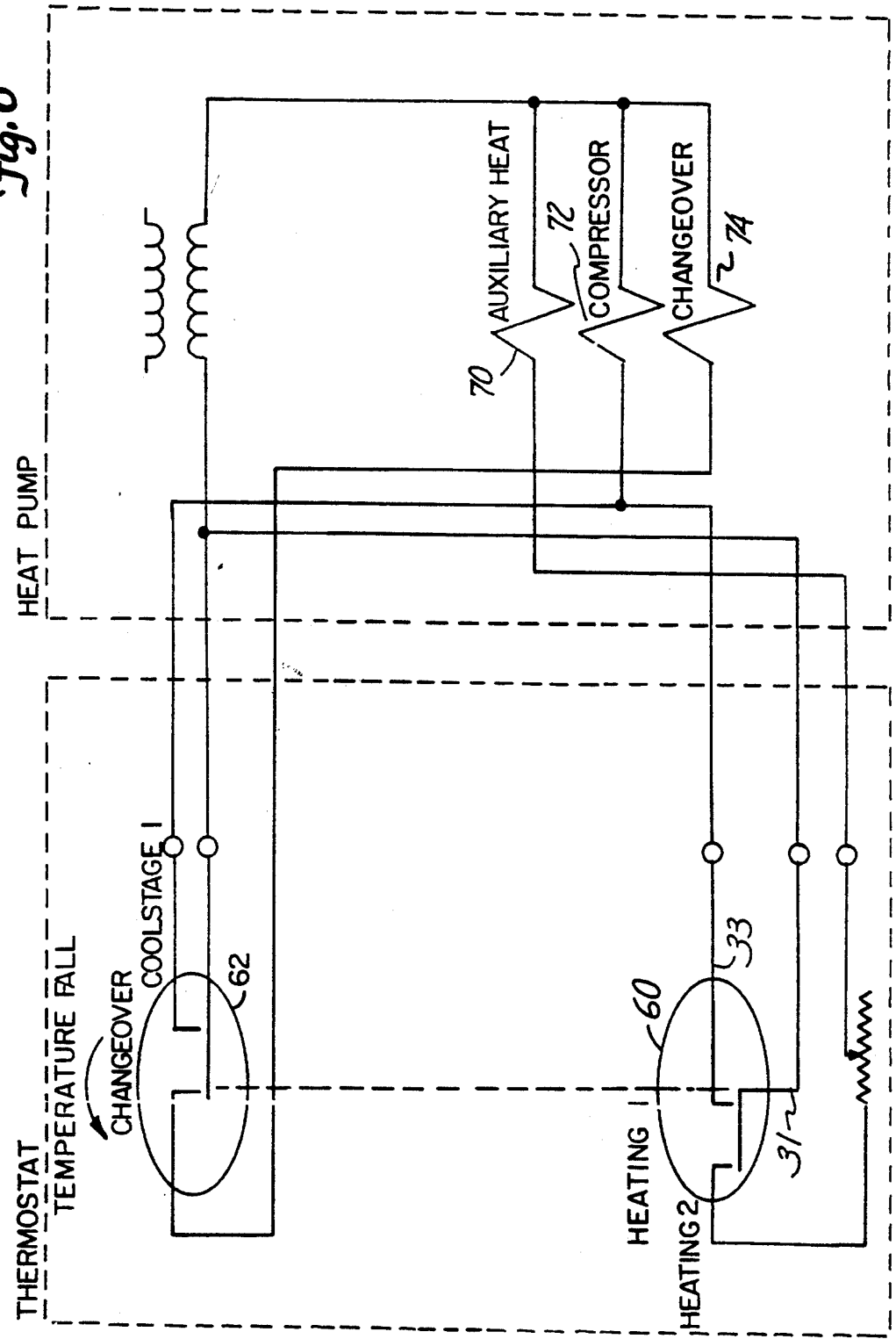
FIG. 6 is a simplified schematic representation of the alternate embodiment of FIG. 5.

FIG. 5 and FIG. 6 may be referred to with the following explanation to understand the operation of the alternate embodiment.

The lower switch 60 has 2 heat stages 1 and 2 which make sequentially on temperature fall. Stage 1 makes at 69° F. and stage 2 makes at 68°. The set point indicator for heat is set at 70° F. on the temperature scale.

The upper switch 62 has 2 cooling stages (changeover and cool stage 1) which make sequentially on temperature rise. (Changeover at 75° F. and cool stage at 76° F.) the setpoint indicator for cool is set at 76° F. on the temperature scale.

Auxiliary heat relay 70, compressor relay 72, and changeover relay 74, are also shown and their function is the same as in FIG. 3.

The chart of operation shows a 6° F. separation between heat and cool operation and indication. This span could be less or more depending on model selected and could be a factory fixed spacing or a field adjustable spacing of switch operation and heat and cool indicators.

The functional circuit operation of this version when used on a heat pump is the same as the 3 switch version except the changeover stage on the 3 switch version makes when heat stage 1 breaks. On this version the temperature must rise 5° F. (typical) from heat stage 1 "break" to changeover stage "make" minimizing the operation of changeover.

This version is also suitable for use with other applications where 2 distinct heat stages and 2 distinct cool stages are desired.

Now that the construction and operation of thermostat 10 have been set forth, certain advantages can be further set forth and appreciated.

Thermostat 10 secures switches 32, 34 and 36 to bimetal 22 by means of switch bracket 26 and integral clips 30. Therefore the operation of switches 32, 34 and 36 in the proper sequence is assured because the switch operating points are physically fixed relative to single bimetal 22. This is an advantage not present in past two bimetal automatic changeover thermostats. In a two bimetal thermostat there is a risk of out of sequence switch operation or thermal crossover since the switch operating points are not fixed relative to a single bimetal. The possible causes for the out of sequence switch operation include manufacturer's tolerances in calibrating the two bimetal, errors in field calibration of the two bimetals and unknown $I^2R$ heating effects on the two bimetals.

In thermostat 10 the spacing between the heat and cool set point indicators is determined based on spacing between specific switch operating points. These switch operating points may be factory adjusted and fixed in which case the spacing of the heat and cool set point indicators would be fixed at the factory. Alternately the switch operating points could be adjusted at the time of thermostat installation. The heat and cool set point indicators would then be adjusted to match the field selected switch operating points. Applicant's invention provides a reliable automatic changeover thermostat having a lower cost to manufacture than that of previous two bimetal thermostats.

In accordance with the foregoing description, applicant has developed a simple automatic changeover thermostat that is easily incorporated into the design of conventional thermostats. Although a specific embodiment of applicant's thermostat is shown and described for illustrative purposes, a number of variations and modifications will be apparent to those of ordinary skill in the relevant arts. It is not intended that coverage be limited to the disclosed embodiment, but only by the terms of the following claims.

We claim:

1. An automatic changeover thermostat for controlling heating apparatus and cooling apparatus for heating and cooling a conditioned space, comprising:
    a base member;
    a support member extending from said base member and mounted for rotation relative to said base member;
    a temperature responsive element secured to said support member;

heating switch means for initiating operation of said heating apparatus;

cooling switch means for initiating operation of said cooling apparatus;

changeover switch means for selectively enabling either said heating switch means or said cooling switch means; said heating switch means, said cooling switch means and said changeover switch means mounted to said temperature responsive element and activated by movement of said temperature responsive element;

a single control point adjustment lever secured to said support member for rotation of said support member, said lever having a heat set point indicator and a cool set point indicator spaced apart; and a temperature scale located adjacent said heat set point indicator and said cool set point indicator;

said control point adjustment lever movable for positioning said set point indicators along said temperature scale.

2. The thermostat of claim 1 wherein said heat set point indicator is a first color and said cool set point indicator is a second color for ease of recognition by the user.

3. An automatic changeover thermostat for controlling heating apparatus and cooling apparatus for heating and cooling a conditioned space, comprising:

a base member;

a single temperature responsive element mounted for rotation relative to said base member;

a heating switch for initiating operation of said heating apparatus when said temperature falls to a first level and for interrupting operation of said heating apparatus when said temperature rises to a second level;

a cooling switch for initiating operation of said cooling apparatus when said temperature rises to a third level, said third level at least 2° F. warmer than said second level;

a changeover switch for selectively enabling said heating switch when said temperature falls to said first level and selectively enabling said cooling switch when said temperature rises to said second level;

said heating switch, said cooling switch and said changeover switch mounted to said single temperature responsive element;

operator adjustment means comprising a single lever coupled to said temperature responsive element for limited rotation of said temperature responsive element relative to said base member, said lever having a heat set point indicator and a cool set point indicator spaced apart; and a temperature scale located adjacent said heat set point indicator and said cool set point indicator, said lever movable for positioning said set point indicators along said temperature scale.

4. The thermostat of claim 3 wherein said heat set point indicator is a first color and said cool set point indicator is a second color for ease of recognition by the user.

* * * * *